(12) United States Patent
Zhang et al.

(10) Patent No.: US 10,448,765 B2
(45) Date of Patent: Oct. 22, 2019

(54) INFLATABLE PILLOW, METHOD AND DEVICE FOR INFLATING AND DEFLATING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xuebo Zhang, Beijing (CN); Jiantao Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 505 days.

(21) Appl. No.: 15/181,873

(22) Filed: Jun. 14, 2016

(65) Prior Publication Data

US 2017/0071371 A1    Mar. 16, 2017

(30) Foreign Application Priority Data

Sep. 11, 2015   (CN) .......................... 2015 1 0580392

(51) Int. Cl.
*A47G 9/10*  (2006.01)
*A47G 9/02*  (2006.01)
(Continued)

(52) U.S. Cl.
CPC ............ *A47G 9/1027* (2013.01); *H04W 4/80* (2018.02); *A47C 7/38* (2013.01); *A47G 9/0253* (2013.01)

(58) Field of Classification Search
CPC ...... A47G 9/10; A47G 9/1027; A47G 9/1081; A47G 9/109; A47G 9/0253; A47G 9/0238; A47C 7/383; A47C 7/38
(Continued)

(56) References Cited

U.S. PATENT DOCUMENTS 4,007,503 A * 2/1977 Watkin ..................... A47G 9/10
                                                    5/490
5,148,564 A * 9/1992 Reder .................. A47G 9/0253
                                                    5/490
(Continued)

FOREIGN PATENT DOCUMENTS

CN    204181352 U    3/2015
CN    204192196 U    3/2015
(Continued)

OTHER PUBLICATIONS

First Chinese Office Action from Chinese Application No. 20150580392.8 dated May 24, 2016.
(Continued)

*Primary Examiner* — Robert G Santos
(74) *Attorney, Agent, or Firm* — Dilworth & Barrese, LLP.; Michael J. Musella, Esq.

(57) ABSTRACT

An inflatable pillow, a method and a device for inflating and deflating the same are disclosed. The inflatable pillow includes a pillow envelope and N airbags in the pillow envelop; an interior of the pillow envelope is partitioned into M chambers and there is provided at least one of the airbags in each of the chambers; each of the airbags has a hole which is configured for inflating and deflating the airbag; M and N are positive integers and M is not larger than N.

20 Claims, 3 Drawing Sheets

(51) Int. Cl.
*A47C 7/38* (2006.01)
*H04W 4/80* (2018.01)

(58) Field of Classification Search
USPC .............. 6/644, 636, 490; 5/644, 636, 490
See application file for complete search history.

(56) References Cited

U.S. PATENT DOCUMENTS

| | | | | |
|---|---|---|---|---|
| 5,243,722 | A * | 9/1993 | Gusakov | A47C 7/021 297/DIG. 3 |
| 5,304,271 | A * | 4/1994 | Gusakov | A47C 7/021 156/145 |
| 9,474,396 | B2 * | 10/2016 | Russell | D05B 13/02 |
| 2005/0050637 | A1 * | 3/2005 | Graebe | A47G 9/1027 5/644 |
| 2007/0220678 | A1 * | 9/2007 | Ciliento | A47G 9/0253 5/636 |
| 2008/0208009 | A1 * | 8/2008 | Shklarski | A61B 5/14552 600/301 |
| 2011/0283460 | A1 | 11/2011 | Chan | |
| 2014/0338130 | A1 * | 11/2014 | Russell | A47G 9/10 5/636 |
| 2017/0071371 | A1 * | 3/2017 | Zhang | H04W 4/80 |

FOREIGN PATENT DOCUMENTS

| | | |
|---|---|---|
| CN | 104840053 A | 8/2015 |
| CN | 204931123 U | 1/2016 |
| JP | 2006101934 A | 4/2006 |

OTHER PUBLICATIONS

Second Chinese Office Action from Chinese Application No. 201510580392.8 dated Oct. 9, 2016.
Third Chinese Office Action from Chinese Application No. 20150580392.8 dated Feb. 28, 2017.

* cited by examiner

INFLATABLE PILLOW, METHOD AND DEVICE FOR INFLATING AND DEFLATING THE SAME

TECHNICAL FIELD

Embodiments of the disclosure relate to an inflatable pillow, a method and a device for inflating and deflating the same.

BACKGROUND

Pillows, as sleep tools, are stuffed articles suitable for people's comfort of sleep. Generally a pillow comprises an interior pillow core and a pillow envelope. There are many types of interior pillow cores. Inflatable pillows having airbags as interior pillow cores are gradually becoming popular with the increased need of work and travel.

The main difference between inflatable pillows and pillows having other stuffing is that the shape and softness of inflatable pillows are adjustable. A user can adjust the degree of inflation of the inflatable pillow by himself/herself according to personal requirements, so that the softness of the inflatable pillow can reach a condition fitting the user best.

A conventional inflatable pillow comprises one airbag only. When adjusting the pillow, adjustment of the shape of the pillow can only be realized by adjusting the height of the whole inflatable pillow roughly, making it impossible for the pillow to fit a user's head and neck accurately.

SUMMARY

A first aspect of the disclosure provides an inflatable pillow comprising a pillow envelope and N airbags in the pillow envelope; an interior of the pillow envelope is partitioned into M chambers and there is provided at least one of the airbags in each of the chambers; each of the airbags has a hole which is configured for inflating and deflating the airbag; M and N are positive integers and M is not larger than N.

A second aspect of the disclosure provides a device for inflating and deflating an inflatable pillow. The device comprises an air pump, a plurality of inflating tubes, a micro controller and a communication chip; the air pump comprises a plurality of inflating holes, each of the inflating holes has a valve, one end of each of the inflating tubes is configured to be connected to the inflating holes, and the other end is configured to be connected to the airbags of the inflatable pillow; and the micro controller is connected to the valves and configured for controlling the valves to open or close according to instructions from the communication chip.

A third aspect of the disclosure provides an inflating method realized through the above device. The method comprises: determining an airbag to be inflated after receiving an inflation start instruction; determining an inflating hole connected to the airbag to be inflated; and opening a valve of the inflating hole and inflating the airbag to be inflated through the air pump and an inflating tube.

A fourth aspect of the disclosure provides a deflating method realized through the above device. The method comprises: determining an airbag to be deflated after receiving a deflation start instruction; determining an inflating hole connected to the airbag to be deflated; and opening a valve of the inflating hole and deflating the airbag through the air pump.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

An embodiment of the disclosure provides an inflatable pillow, comprising a pillow envelope and N airbags; an interior (space) of the pillow envelope is partitioned into M chambers and there is provided at least one airbag in each of the chambers; each of the airbags has a hole (or port) which is configured for inflating and deflating the airbag; herein M and N represent positive integers and M is not larger than N. As the inflatable pillow provided by the embodiment of the disclosure is partitioned into a plurality of regions and each of the regions comprises one or more airbags, a user can adjust the airbags in a specific region as required and can adjust heights of airbags in chambers disposed in different positions of the pillow independently, thereby accurately adjusting the shape of the pillow and allowing the pillow to better fit the user's head and neck.

Figure 1:
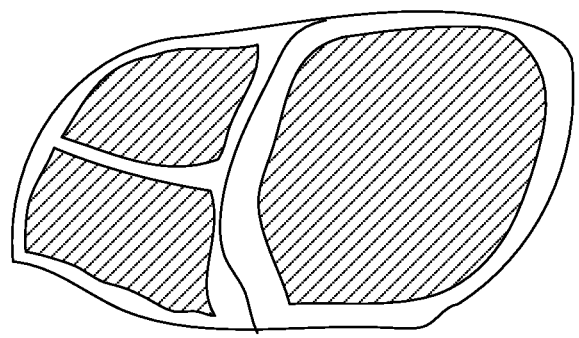
FIG. 1 schematically illustrates an inflatable pillow in accordance with an embodiment of the disclosure.

FIG. 1 schematically illustrates an inflatable pillow of the embodiment of the disclosure when M=2 and N=3, and in the drawing the solid dividing line in the middle of the pillow is a dividing line between a left chamber and a right chamber. The left chamber has two airbags and the right chamber has one airbag. The inflatable pillow in FIG. 1 is for illustrative purpose only, and the shape of the pillow, the value of M and N, the dividing pattern of chambers of the pillow envelope and the like may be selected in different ways from the example as illustrated in FIG. 1 in practical applications.

A material of the pillow envelope in the embodiment of the disclosure may be a material suitable for a pillow envelope such as cotton, flannelette, linen, or the like.

A material of the airbags may be air-tight and elastic materials such as rubber, PVC, nylon, or the like. Each of the airbags has an inflating hole. The inflating holes may be made of an air-tight material such as sealing cotton or rubber. The inflating holes can each have an inflating tube made of a flexible and air-tight material (such as rubber) inserted therein. The user can inflate and deflate one airbag when the inflating tube is inserted into the inflating hole; the inflating hole is in a sealed state when the inflating tube is not inserted therein. In order to realize the above function, a rubber pad may be disposed in the inflating hole of the airbag. When the inflating tube is inserted, the rubber pad is pushed open to allow air to pass therethrough and thus allow the airbag to be inflated and deflated; when the inflating tube is pulled out, an outward pressure applied to the rubber pad from the air inside the airbag allows the rubber pad to be closed, thereby realizing the air-tight function of the inflating hole.

The airbags may be round, square or in other shapes.

Figure 2:
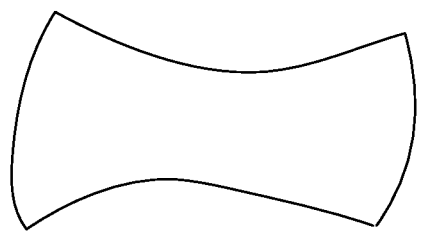
FIG. 2 schematically illustrates a pillow envelope of an inflatable pillow in accordance with an embodiment of the disclosure.

In at least some of the embodiments of the disclosure, as illustrated in FIG. 2, the pillow envelope has a structure of two wider ends and a narrower middle part. That is, a width of both ends of the pillow envelope is larger than that of the middle part of the pillow envelope along the length direction.

The structure of two wider ends and a narrower middle part is configured for adapting to the neck shape of human. The pillow envelope may also have other shapes (such as a rectangle).

Figure 3:
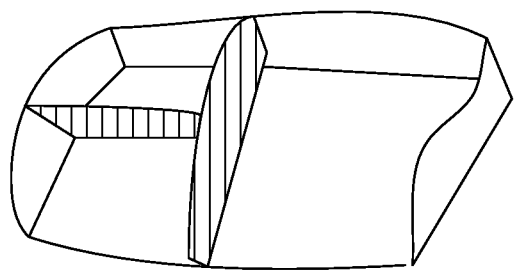
FIG. 3 schematically illustrates a pillow envelope of an inflatable pillow in accordance with an embodiment of the disclosure.

As illustrated in FIG. 3, the pillow envelope comprises a cover and a partitioning interlayer, and an interior space of the cover of the pillow envelope is partitioned into a plurality of chambers by the partitioning interlayer. The partitioning interlayer and the cover of the pillow envelope is fixed together (may be stitched together or an integrally formed structure). At least one airbag can be stored in each of the chamber, and the shape of the airbag adapts to that of the chamber. As an example, the pillow envelope comprises a rectangular chamber having a rectangular airbag or two square airbags. The user can open the cover of the pillow envelope and place or install the airbag in the chamber. A structure configured for opening and closing the cover of the pillow envelope on the pillow envelope may be a zipper. The cover of the pillow envelope has one or more holes and an inflating tube can be inserted into the inflating hole of an airbag through the cover of the pillow envelope.

Figure 4:
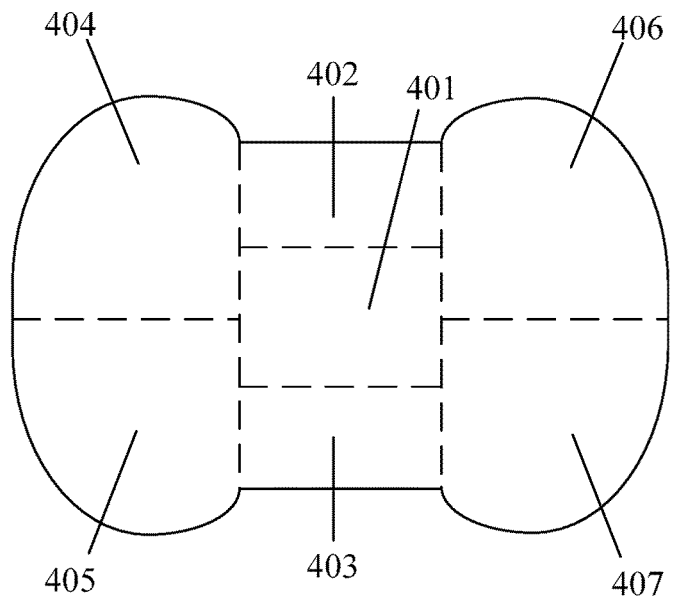
FIG. 4 schematically illustrates another inflatable pillow in accordance with an embodiment of the disclosure.

In at least some of the embodiments of the disclosure, as illustrated in FIG. 4, the inflatable pillow may comprise seven chambers. The seven chambers comprise a central chamber 401 configured for supporting the head when the user is in a supine posture or position, an upper middle chamber 402 configured for supporting the neck of the user in the supine posture, a lower middle chamber 403 configured for supporting the neck of the user in the supine posture, as well as a top left chamber 404, a bottom left chamber 405, a top right chamber 406 and a bottom right chamber 407 which are configured for supporting the face of the user in a lateral position. The airbags in the seven chambers are configured for supporting the head, face or neck under different sleeping positions. Due to the above configuration, it is possible to allow the inflatable pillow to adapt to the structure of head and neck of the user in different sleeping positions through adjustment of the airbags in the chambers of the inflatable pillows.

The central chamber 401, the upper middle chamber 402 and the lower middle chamber 403 are positioned in the middle part of the inflatable pillow, and the central chamber 401 is between the upper middle chamber 402 and the lower middle chamber 403.

The top left chamber 404, the bottom left chamber 405, the top right chamber 406 and the bottom right chamber 407 are positioned at the top left part, the bottom left part, the top right part and the bottom right part of the inflatable pillow respectively.

Along a horizontal direction, the chambers positioned in the middle part of the pillow (e.g., the central chamber 401, the upper middle chamber 402 and the lower middle chamber 403) have relatively small widths, and the chambers positioned at both ends (e.g., the top left chamber 404, the bottom left chamber 405, the top right chamber 406 and the bottom right chamber 407) have relative large widths. The chambers of the pillow envelope may be axial symmetry along the length direction and/or the width direction.

In at least some of the embodiments of the disclosure, a height of the inflated airbags of the central chamber 401, the upper middle chamber 402 and/or the lower middle chamber 403 is smaller than that of the inflated airbags of the top left chamber 404, the bottom left chamber 405, the top right chamber 406 and/or the bottom right chamber 407. The height is determined by measuring along a direction orthogonal to the plane of the paper in the example shown in the drawing.

In the embodiment of the disclosure, the height of the airbags positioned in the middle part is larger than that of the airbags positioned at both ends when the pillow fully inflated, thus adapting to the structure of neck of the user.

In at least some of the embodiments of the disclosure, the inflatable pillow further comprises at least one pressure sensor, a micro processor and a memory; the at least one pressure sensor is disposed in at least one of the chambers; the at least one pressure sensor is configured for transforming a pressure detected by the pressure sensor into an analog signal; the micro processor is connected to all pressure sensors and configured for transforming the analog signals from the pressure sensors into digital data; and the memory is connected to the micro processor and configured for storing the digital data.

The pressure sensor of the inflatable pillow in the embodiment of the disclosure may be installed on the airbags or in the chambers of the pillow envelope.

The inflatable pillow in the embodiment of the disclosure can be configured for monitoring the sleeping status of a user. The parameters of the sleeping status may comprise sleeping time, sleeping quality, etc. A sleeping time period is a duration when the pressure sensor sensing a pressure. The pressure sensor generates analog signals (signal of voltage or current) when being pressed, and the micro processor transforms the analog signals into digital data. The timing begins when the micro processor (may be a chip such as a single chip, DSP, or the like) senses signals from the pressure sensor(s) and stops when the pressure signals disappear. The duration between beginning and stopping of the timing is the sleeping time.

The sleeping quality may refer to duration of deep sleep in the entire sleeping time. The method of determining deep sleep and light sleep is: if the frequency of movement of the user's head is low, the user is in deep sleep state; if the frequency of movement of the user's head is relatively high, the user is in light sleep state.

Figure 5:
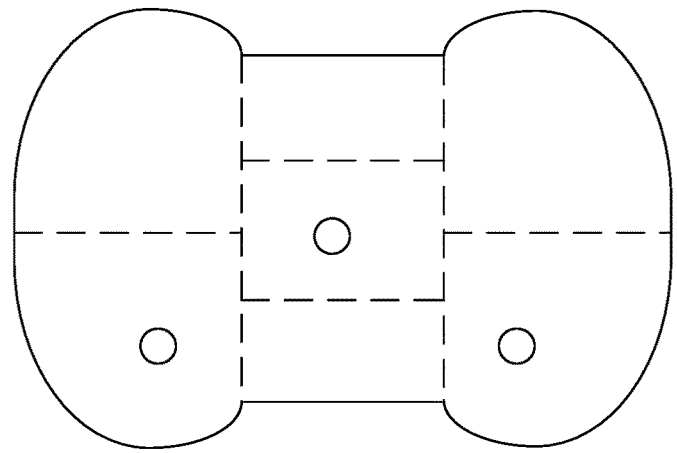
FIG. 5 schematically illustrates an inflatable pillow having pressure sensors disposed therein in accordance with an embodiment of the disclosure.

In at least some of the embodiments of the disclosure, it is possible to determine the frequency of movement of the user's head through pressure sensing via sensors. One pressure sensor may be disposed in each of the chambers of the inflatable pillow; or one pressure sensor may be disposed in each of some of the chambers; or a plurality of pressure sensors may be disposed in each of the chambers; or a plurality of pressure sensors may be disposed in each of some of the chambers. As an example, as illustrated in FIG. 5, the pillow envelope comprises the central chamber, the upper middle chamber, the lower middle chamber, the top left chamber, the bottom left chamber, the top right chamber and the bottom right chamber. One pressure sensor is disposed in each of the bottom left chamber, the bottom right chamber and the central chamber. Due to the above configuration, the pressure sensor can detect a turning direction of the user's head in the inflatable pillow. As an example, if the user's head turns to left, the value of the pressure signals of the pressure sensor in the bottom left chamber is larger than that of the pressure signals of the pressure sensor in the bottom right chamber.

Figure 6:
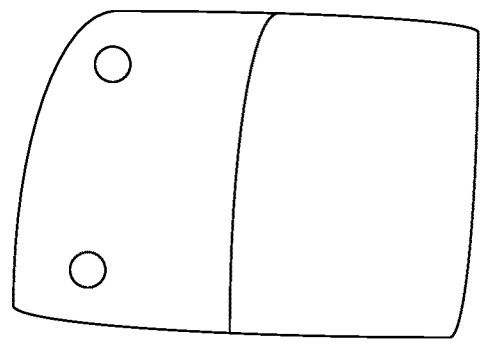
FIG. 6 schematically illustrates another inflatable pillow having pressure sensors disposed therein in accordance with an embodiment of the disclosure.

As an example, as illustrated in FIG. 6, the pillow envelope of the inflatable pillow comprises a left chamber and a right chamber. One pressure sensor may be disposed in each of a top left part and a bottom left part of the left chamber respectively.

The micro processor determines whether the user is in deep sleep according to changes of pressure signals from the plurality of pressure sensors. As an example, as illustrated in FIG. 5, the value of the pressure signal received by the micro processor from the pressure sensor in the bottom left chamber of the inflatable pillow changes from large to small then from small to large. If a trend of the value of the pressure signal received by the micro processor from the pressure sensor in the bottom right chamber is contrary to that of the value of the pressure signal from the pressure sensor in the bottom left chamber, it represents that the user's head moves between left to right constantly, thus the user is in light sleep. If the value of the pressure signal received by the micro processor from the pressure sensor in the central chamber keeps changing, it represents that the user's head moves up and down on the inflatable pillow, thus the user is in light sleep. If the variations of the values of pressure signals received by the micro processor from the plurality of pressure sensors do not exceed a predetermined variation range in a predetermined duration, it represents that the user is in deep sleep. The predetermined duration of deep sleep can be configured on an end device or an external control device and then sent to the inflatable pillow. As an example, the user may set the duration of deep sleep to 10 minutes on a mobile phone and then send the duration to the inflatable pillow. The variation ranges of the values of the pressure signals may be configured on an end device or an external control device and then sent to the inflatable pillow. As an example, the user may set a variation limit of the pressure value of the pressure sensor to be 30% per second (i.e., the variation percentage of the pressure relative to the pressure one second ago) on a remote controller. If the variation exceeds 30%, it represents that the user moves his head. If the variation did not exceed 30%, it represents that the user's head is steady.

In a practical application, if the value of the pressure signals received by the micro processor from the plurality of the pressure sensors do not change (the value of the pressure cannot be 0) or do not exceed the respective variation limits, a timer 1 begins timing. When the timing reaches a certain duration, which represents that the user's head does not move in a relatively long time period, a timer 2 is started and begins timing until the pressure signals received by the micro processor exceed the variation limit, then the timer 2 stops and a timer 2 stops. After the timer 2 stops, the micro processor determines whether the user's head has moved away from the pillow according to the signals from the pressure sensor. If the user's head leaves the pillow, the value of the timer 2 is used as the duration of deep sleep. If the user's head do not leave the pillow, the micro processor determines again whether the user's head has left the pillow; after the timing started by the timer 1 reaches a certain time again, the timer 2 can be started again and continue to count on the basis of the last value. When the micro processor discovers that the pressure signals of all the pressure sensors disappear, it represents that the sleeping length of the user is over. The duration recorded on the timer 2 is the duration of the deep sleep of the user.

In at least some of the embodiments of the disclosure, the inflatable pillow further comprises a communication chip connected to the memory and configured for transmitting the digital data stored in the memory.

The inflatable pillow in the embodiment of the disclosure can store in the memory the data of the sleeping status (such as the duration of sleep and the duration of deep sleep) obtained by the micro processor, so that the user can access the data at any time. The memory may be a memory chip such as $E^2PROM$, FLASH, or the like, which can keep the data when power is shut off. The communication chip can communicate with an external end device (such as mobile phone, tablet PC, or the like) and transmit the data of the sleeping status to the end device.

The communication chip of the embodiment of the disclosure may employ wireless communication and may be such as a Bluetooth communication chip, a WIFI (Wireless-Fidelity) chip or other communication chips having wireless communication function therein.

The user can query the data of the sleeping status of the inflatable pillow for example through an APP (Application) in the mobile phone.

The inflatable pillow in the embodiment of the disclosure may supply power to the pressure sensor(s), the micro processor and the communication chip through a power supply. In order to increase the portability, the inflatable pillow may also use a battery having a relatively small size (such as a silver-zinc battery, lithium ion battery, or the like) as the power supply.

In order to inflate the inflatable pillow in the embodiment of the disclosure, the embodiment of the disclosure further provides a device for inflating and deflating the inflatable pillow.

Figure 7:
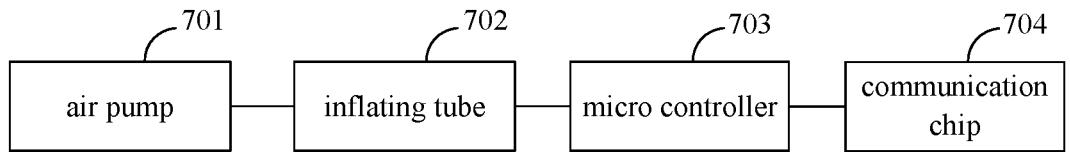
FIG. 7 schematically illustrates a block diagram of an inflating and deflating device in accordance with an embodiment of the disclosure FIG. 8 schematically illustrates a block diagram of an external end device in accordance with an embodiment of the disclosure.

As illustrated in FIG. 7, the embodiment of the disclosure provides a device for inflating and deflating the inflatable pillow. The device comprises an air pump 701, one or more inflating tubes 702, a micro controller 703, and a communication chip 704; the air pump 701 comprises one or more inflating holes, each of the inflating holes has a valve, one end of each of the inflating tubes 702 is connected to one of the inflating holes, and the other end is connected to one of the airbags of the inflatable pillow; and the micro controller 703 is connected to the valves and configured for controlling the valves to open or close according to instructions from the communication chip 704.

The air pump of the device for inflating and deflating the inflatable pillow provided by the embodiment of the disclosure may be controlled by the micro controller 703. The micro controller 703 may be a single chip, an embedded chip or other controlling chips. The micro controller 703 can control the switch states of valves of the inflating hole(s) of the air pump 701 and can control the air pump 701 to work to inflate or deflate the pillow.

The communication chip can receive control signals from an external end device and transmit the control signals to the micro controller 703. The micro controller 703 controls the air pump 701 according to the control signals received. The communication chip may employ a wireless communication and may be such as a Bluetooth communication chip, a WIFI chip or other communication chips having wireless communication function therein. The terminal may be a mobile phone, a tablet PC and the like, and may be a remote controller configured for controlling the device for inflating and deflating the inflatable pillow. The device for inflating and deflating the inflatable pillow can control all or part of the airbags of the inflatable pillow to be inflated or deflated according to the control signals received by the communication chip more accurately, thereby improving the accuracy of the control of the inflatable pillow.

In a practical application, when it is required to inflate the inflatable pillow using the device for inflating and deflating the inflatable pillow, for example the user inserts the inflating tubes of the device for inflating and deflating the inflatable pillow into all the inflating holes of the inflatable pillow (the number of inflating holes of the air pump 701 is no more than that of the inflating holes of the airbags) and control the action of the device for inflating and deflating the inflatable pillow through an external control device for example. All valves of inflating holes of the device for inflating and deflating the inflatable pillow are closed by default, and the airbags will not inflate or deflate when the inflating tubes 702 are inserted.

There are two types of action of controlling the device for inflating and deflating the inflatable pillow through the external controlling device: the inflating action and the deflating action.

1. The Inflating Action

The user may control the air pump 701 to inflate a determined airbag. The user may select to inflate one airbag, or to inflate a plurality of airbags simultaneously. As an example, the inflating action comprises two steps: starting the inflation and stopping the inflation.

In at least some of the embodiments of the disclosure, the device for inflating and deflating the inflatable pillow determines the airbags to be inflated of the inflatable pillow after receives an inflation start instruction from the external controlling device; the device for inflating and deflating the inflatable pillow determines the inflating holes connected to the determined airbags through the inflating tubes 702; the device for inflating and deflating the inflatable pillow open the valves of the inflating holes and control the air pump 701 to inflate the airbags.

In at least some of the embodiments of the disclosure, the inflating tubes 702 of the device for inflating and deflating the inflatable pillow and the inflating holes of the airbags of the inflatable pillow have labels or are numbered, and the inflating tubes 702 correspond to the inflating holes in one to one correspondence relationship. The user should insert the inflating tubes 702 into the inflating holes of the inflatable pillow having the same serial numbers as the inflating tubes 702. As an example, the user inserts an inflating tube 1 into an inflating hole of the inflatable pillow having a serial number of 1. Due to the above configuration, the device for inflating and deflating the inflatable pillow can determine the inflating holes of the air pump 701 corresponding to the airbags to be inflated by the user, and inflate the airbags through the inflating holes.

As an example, the communication chip of the device for inflating and deflating the inflatable pillow receives the inflation start instruction transmitted by an external controlling device to inflate an airbag 1, determines an inflating hole 1 of the air pump 701 connected to the airbag 1 through the inflating tube 702, opens the valve of the inflating hole 1, and inflates through the inflating hole 1.

The external end device in the embodiment of the disclosure can transmit inflation or deflation instructions to the device for inflating and deflating the inflatable pillow.

Figure 8:
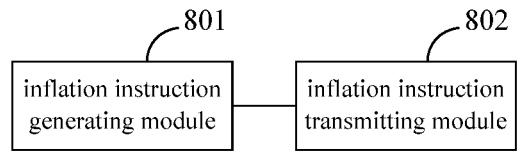

As illustrated in FIG. 8, the embodiment of the disclosure provides an external end device. The external end device comprises: an inflation instruction generating module 801, which is configured for generating an inflation start instruction after confirming that the user needs to inflate the inflatable pillow; an inflation instruction transmitting module 802, which is configured for transmitting the inflation start instruction to the device for inflating and deflating the inflatable pillow, so that the device for inflating and deflating the inflatable pillow inflates the corresponding airbags of the inflatable pillow according to the inflation instruction.

The external end device of the embodiment of the disclosure may be a mobile phone, a tablet PC, or the like. The external end device communicates with the communication chip of the device for inflating and deflating the inflatable pillow. The benefit of adjusting the device for inflating and deflating the inflatable pillow to inflate the inflatable pillow through the external end device is that, the external end device is portable, and the user can lie on the pillow and adjust the inflation and deflation of the device for inflating and deflating the inflatable pillow using the external end device according to the fitness of the pillow and the user's head and neck.

In a practical application, the external end device may display all the airbags of the inflatable pillow in a graphical interface. Shapes of the drawings of the airbags may be the same as that of the chambers. As an example, if the chambers are rectangular, shapes of the drawings corresponding to the chambers in the graphical interface are rectangular too; if the chambers are semicircular, shapes of the drawings corresponding to the chambers in the graphical interface are semicircular too.

Also, for example, the position of the drawing representing the airbags in the external end device is the same as that of the airbags of the inflatable pillow. As an example, the airbag in the top left chamber of the inflatable pillow is on the top left in the graphical interface. The chambers of the inflatable pillow may be symmetry in the up-and-down direction, or may be symmetry in the left-and-right direction. In order to allow the positions of the airbags in the chambers to be specific so as the external end device can control the device for inflating and deflating the inflatable pillow to inflate and deflate an airbag in a certain position, when inflating and deflating the inflatable pillow, the arrangement direction of the pillow is specific, and there is labels on the pillow envelope representing the left-and-right and up-and-down directions. As an example, a word "Left" is on the left part of the pillow envelope, a word "Right" is on the right part, a word "UP" is on the top part, and a word "Down" is on the bottom part. It is also possible to label the arrangement direction of the pillow in other ways such as arrows pointing different directions.

The external end device in the embodiment of the disclosure may display the inflating and deflating status of airbags in all chambers of the inflatable pillow in a graphical interface. After the user sends the inflation start instruction to the device for inflating and deflating the inflatable pillow using the external end device, the drawings of the airbags which the user select to inflate in the graphical interface of the external end device begin to change, which represents that the airbags corresponding to the drawings are being inflated.

As an example, after the user sends the inflation start instruction of inflating the airbag in the top left chamber using the external end device, the drawing corresponding to the airbag in the top left chamber becomes red from the original grey color.

After the device for inflating and deflating the inflatable pillow in the embodiment of the disclosure starts inflating the airbags, the user can stop the inflation to the airbags of the inflatable pillow through controlling the device for inflating and deflating the inflatable pillow when the height of the airbags meets the user's need.

In at least some of the embodiments of the disclosure, the device for inflating and deflating the inflatable pillow determines the airbags for stopping inflation to the inflatable pillow after receiving the inflation stop instruction from the external controlling device; the device for inflating and deflating the inflatable pillow determines the inflating holes connected to the determined airbags through the inflating holes 702; and the device for inflating and deflating the inflatable pillow close the valves of the inflating holes and close the air pump 701 after determining no airbags need to be inflated.

In the embodiment of the disclosure, the user can send the inflation stop instruction of stopping the inflation to the airbags appointed by the user after the user sends the inflation start instruction to the device for inflating and deflating the inflatable pillow through the external end device.

As an example, the user sends an inflation start instruction to the airbag 1 before sending an inflation stop instruction. The user can select the airbag for stopping inflation thereto as the airbag 1 and send the inflation stop instruction, or send the inflation stop instruction to some airbags being inflated, or send the inflation stop instruction to all the airbags being inflated.

The external end device in the embodiment of the disclosure can transmit the inflation stop instruction to the device for inflating and deflating the inflatable pillow.

Specifically, the external end device generates the inflation stop instruction after determining that the user needs to stop the inflation to the inflatable pillow; the external end device transmits the inflation stop instruction to the device for inflating and deflating the inflatable pillow so that the device for inflating and deflating the inflatable pillow stops the inflation to the corresponding airbag in the inflatable pillow according to the inflation stop instruction.

The external end device in the embodiment of the disclosure can display which chamber the airbag being inflated is within through a graphical interface.

As an example, in the graphical interface, the airbag being inflated in the chamber of the inflatable pillow is shown red, while a grey color represents no actions.

The device for inflating and deflating the inflatable pillow in the embodiment of the disclosure may also stop the inflation automatically. Some situations are described in the following.

The first situation: the device for inflating and deflating the inflatable pillow stops the inflation automatically when the duration of continuous inflation reaches the duration preset by the user.

As an example, the user configures the device for inflating and deflating the inflatable pillow to inflate the airbag 1 for one minute. The device for inflating and deflating the inflatable pillow stops the inflation to the airbag 1 automatically after inflating the airbag 1 for one minute.

The second situation: the device for inflating and deflating the inflatable pillow detects an air pressure of the airbag during the inflation process, and stops the inflation automatically when the air pressure reaches a preset value.

As an example, the user configures that the device for inflating and deflating the inflatable pillow inflates the airbag 1 and stops the inflation when the air pressure of the airbag 1 reaches A Pascal, where A is a positive value. Due to the above configuration, the device for inflating and deflating the inflatable pillow inflates the airbag 1 and stops the inflation when the air pressure of the airbag 1 reaches A Pascal.

2. The Deflating Action

The device for inflating and deflating the inflatable pillow in the embodiment of the disclosure can deflate the airbags.

In at least some of the embodiments of the disclosure, the device for inflating and deflating the inflatable pillow determines the airbags to be deflated of the inflatable pillow after receiving a deflation start instruction from the external controlling device.

The device for inflating and deflating the inflatable pillow determines the inflating holes connected to the determined airbags through the inflating tubes 702; and the device for inflating and deflating the inflatable pillow opens the valves of the inflating holes and controls the air pump 701 to deflate the airbags.

The device for inflating and deflating the inflatable pillow in the embodiment of the disclosure may deflate a selected airbag or deflate all the airbags simultaneously. The inflating action and deflating action may be done alternately. As an example, the user inflates an airbag when lying on the pillow and discovers that the airbag is over inflated, and then the user controls the device for inflating and deflating the inflatable pillow through the external controlling device to deflate the airbag. If the airbag is over deflated, the user can control the device for inflating and deflating the inflatable pillow to conduct an inflating action.

In at least some embodiments of the disclosure, the device for inflating and deflating the inflatable pillow determines the airbag which needs to stop deflation after receiving the deflation stop instruction from the external controlling device; the device for inflating and deflating the inflatable pillow determines the inflating holes connected to the airbags which needs to stop deflation through the inflating tubes 702; and the device for inflating and deflating the inflatable pillow closes the valves of the inflating holes and closing the air pump 701 after determining that no airbag needs to be deflated.

The external end device in the embodiment of the disclosure can send the deflation start instruction to the device for inflating and deflating the inflatable pillow to control the device for inflating and deflating the inflatable pillow to deflate the determined airbags.

The external end device generates the deflation start instruction after determining that the user intends to deflate the inflatable pillow; and the external end device transmits the deflation start instruction to the device for inflating and deflating the inflatable pillow, so that the device for inflating and deflating the inflatable pillow deflates the corresponding airbags of the inflatable pillow according to the deflation start instruction.

The external end device in the embodiment of the disclosure can display the inflating and deflating status of airbags in all chambers of the inflatable pillow in a graphical interface. After the user sends the deflation start instruction to the device for inflating and deflating the inflatable pillow through the external end device, the drawing corresponding to the airbag selected for deflation by the user in the graphical interface of the external end device begins to change, which represents the airbag corresponding to the drawing is being deflated.

As an example, after the user sends the deflation start instruction to the airbag in the top left chamber, the drawing corresponding to the airbag in the top left chamber turns to green from the original grey color.

The external end device in the embodiment of the disclosure can transmit the deflation stop instruction to the device for inflating and deflating the inflatable pillow after transmitting the deflation start instruction to the device for inflating and deflating the inflatable pillow.

After the external end device transmitting the deflation start instruction to the device for inflating and deflating the inflatable pillow, the deflation method further comprises: generating the deflation stop instruction by the external end device after determining that the user needs to stop the deflation to the inflatable pillow; and transmitting, by the external end device, the deflation stop instruction to the device for inflating and deflating the inflatable pillow, so that the device for inflating and deflating the inflatable pillow stops the deflation to the corresponding airbag of the inflatable pillow according to the deflation stop instruction.

The external end device in the embodiment of the disclosure can display which chamber the airbag being deflated is within through the graphical interface.

As an example, as illustrated in the graphical interface, the airbag in the chamber being deflated of the inflatable pillow is shown green, and a grey color represents no actions.

The device for inflating and deflating the inflatable pillow in the embodiment of the disclosure may also stop the deflation automatically. The automatic deflation stop is similar with the automatic inflation stop. Some situations are described as the following.

The first situation: the device for inflating and deflating the inflatable pillow stops the deflation automatically when the duration of continuous deflation reaches the duration preset by the user.

The second situation: the device for inflating and deflating the inflatable pillow detects an air pressure of the airbag during the deflation process, and stops the deflation automatically when the air pressure reaches a preset value.

The inflation stop instruction and the deflation stop instruction of the device for inflating and deflating the inflatable pillow in the embodiment of the disclosure may be a same instruction as "STOP". The device for inflating and deflating the inflatable pillow stops the inflation or deflation active and closes the valve of the inflating hole connected to the airbag configured by the user of the air pump 701 after receiving the instruction.

The embodiment of the disclosure further provides a method for inflating and deflating the inflatable pillow. As the method is realized through the device for inflating and deflating the inflatable pillow in the embodiment of the disclosure, the application of the method can be described with reference to the operation description of the device, and it will not be elaborated herein.

Figure 9:
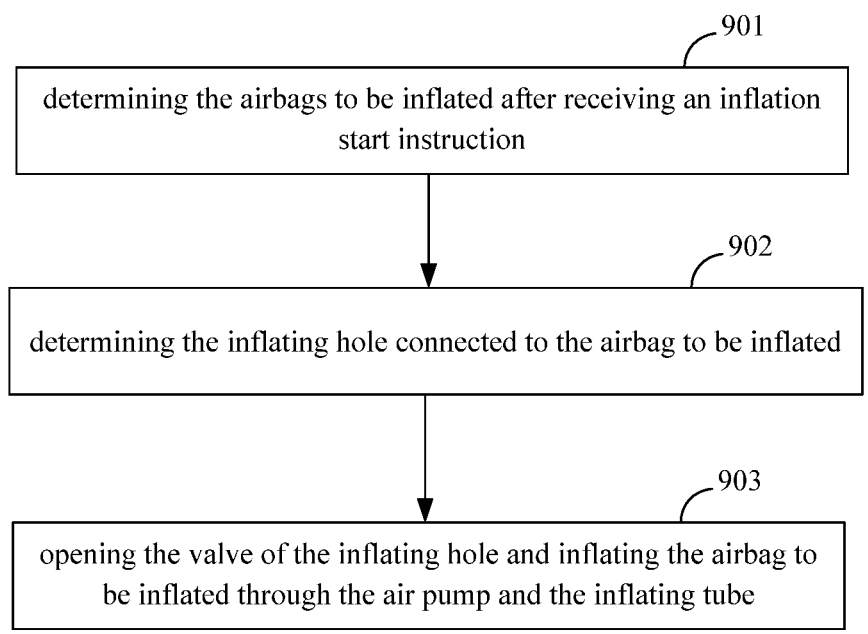
FIG. 9 schematically illustrates a method for inflating an inflatable pillow in accordance with an embodiment of the disclosure.

As illustrated in FIG. 9, the embodiment of the disclosure provides a method for inflating the inflatable pillow in the embodiment of the disclosure. The method is executed through the device for inflating and deflating the inflatable pillow in above embodiments and comprises:

Step 901, determining the airbags to be inflated after receiving an inflation start instruction;

Step 902, determining the inflating hole connected to the airbag to be inflated; and Step 903, opening the valve of the inflating hole and inflating the airbag to be inflated through the air pump and the inflating tube.

In at least some of the embodiments of the disclosure, after the step of opening the valve of the inflating hole and inflating the airbag to be inflated through the air pump and the inflating tube, the method may further comprise: determining the airbag which needs to stop inflation after receiving an inflation stop instruction; determining the inflating hole connected to the airbag which needs to stop inflation; and closing the valve of the inflating hole and closing the air pump after determining that no airbag needs to be inflated.

In at least some of the embodiments of the disclosure, before receiving the inflation start instruction, the method may further comprise: generating the inflation start instruction by the external end device after determining that the user needs to inflate the inflatable pillow; and transmitting, by the external end device, the inflation start instruction to the communication chip.

In at least some of the embodiments of the disclosure, after the step of transmitting the inflation start instruction to the communication chip by the external end device, the method may further comprise: generating the inflation stop instruction by the external end device after determining that the user needs to stop the inflation to the inflatable pillow; and transmitting, by the external end device, the inflation stop instruction to the communication chip.

The embodiment of the disclosure further provides a method for deflating the inflatable pillow in the embodiment of the disclosure. The method is executed through the device for inflating and deflating the inflatable pillow in above embodiments and comprises: determining the airbags to be deflated after receiving a deflation start instruction; determining the inflating holes connected to the airbags to be deflated; and opening the valves of the inflating holes and deflating the airbags through the air pump.

In at least some of the embodiments of the disclosure, after the step of opening the valves of the inflating holes and deflating the airbags through the air pump, the method further comprises: determining the airbags which need to stop deflation after receiving an deflation stop instruction; determining the inflating holes connected to the airbags which need to stop deflation; and closing the valves of the inflating holes and closing the air pump after determining that no airbag needs to be deflated.

In at least some of the embodiments of the disclosure, before receiving the deflation start instruction, the method may further comprise: generating the deflation start instruction by the external end device after determining that the user needs to deflate the inflatable pillow; and transmitting the deflation start instruction to the communication chip by the external end device.

In at least some of the embodiments of the disclosure, after the external end device transmitting the deflation start instruction to the communication chip, the method further comprises: generating the deflation stop instruction by the external end device after determining that the user needs to stop the deflation to the inflatable pillow; and transmitting, by the external end device, the deflation stop instruction to the communication chip.

It can be seen from the above embodiments of the disclosure, the inflatable pillow is partitioned into a plurality of regions and there is one or more airbags in each of the regions, thus the user can adjust the airbags in certain region(s) according to requirements, thereby accurately adjusting the shape of the pillow and allowing the pillow to fit the user's head and neck.

Those skilled in the art will understand that the embodiment of the disclosure may be provided as a method, a system or a computer application product. Therefore, the above embodiments may be implemented fully or partially by means of hardware, software, or firmware, or any combination of hardware, software, or firmware. Furthermore, the disclosure may be implemented as a form of a computer software product (including one or more modules) implemented on one or more storage medias available for a computer (include but is not limited to a disk storage, a CD-ROM, an optical storage and the like) having software code (instruction) available for the computer to execute.

The disclosure is described with reference to flow charts and/or block diagrams according to the methods, devices (systems) and application products for computers of the embodiments of the disclosure. It should be understood that, it is possible to realize the combination of each process and/or square frame of the flow charts and/or block diagrams, and the combination of the processes and/or square frames of the flow charts and/or block diagrams through computer application instructions. It is possible to provide the computer application instructions to general computer, customized computers, embedded processors or other processors of programmable data processing devices to generate a machine, so that the instructions executed by computers or other processors of programmable data processing devices can generate a device which has the appointed functions in one or more processes of the flow charts and/or one square frame or a plurality of square frames of the block diagrams.

The computer application instructions may also be stored in storage media readable by computers, which can guide computers or other programmable data process devices to work in a certain way, thus allowing the instructions stored in the storage media readable by computers to generate a manufactured product comprising an instruction device. The instruction device is configured for realizing the appointed functions in one or more processes of the flow charts and/or one square frame or a plurality of square frames of the block diagrams.

The computer application instructions may also be loaded into a computer or other programmable data processing device so that a series of operation steps is executed on the computer or other programmable data processing device to generate processes realized by computers, thereby allowing the instructions executed on the computers or other programmable data processing devices to provide steps configured for realizing the functions appointed in one or more processes of the flow charts and/or one square frame or a plurality of square frames of the block diagrams.

What is described above is related to the illustrative embodiments of the disclosure only and not limitative to the scope of the disclosure; the scopes of the disclosure are defined by the accompanying claims.

The present application claims priority from Chinese Application No. 201510580392.8, filed on Sep. 11, 2015, the disclosure of which is incorporated herein by reference in its entirety.

What is claimed is:

1. An inflatable pillow, comprising a pillow envelope and N airbags in the pillow envelope;
   wherein an interior of the pillow envelope is partitioned into M chambers and there is provided at least one of the airbags in each of the chambers;
   each of the airbags comprises a hole which is configured for inflating and deflating the airbag; and
   M and N are positive integers and M is not larger than N; and
   the pillow envelope comprises a cover and a partitioning interlayer, and an interior space of the cover of the pillow envelope is partitioned into the M chambers by the partitioning interlayer.

2. The inflatable pillow of claim 1, further comprising at least one pressure sensor, a micro processor and a memory; wherein
   the at least one pressure sensor is disposed in at least one of the chambers and configured for transforming a pressure detected by the at least pressure sensor into an analog signal;
   the micro processor is connected to the at least one pressure sensor and configured for transforming the analog signal from the at least one pressure sensor into digital data; and
   the memory is connected to the micro processor and is configured for storing the digital data.

3. The inflatable pillow of claim 2, further comprising:
   a communication chip connected to the memory and configured for transmitting the digital data stored in the memory.

4. The inflatable pillow of claim 3, wherein the communication chip is a Bluetooth chip or a WIFI chip.

5. The inflatable pillow of claim 1, wherein the pillow envelope is of a structure of two wider ends and a narrower middle part.

6. The inflatable pillow of claim 5, wherein M=7.

7. The inflatable pillow of claim 6, wherein the 7 chambers comprise a central chamber configured for supporting a head of a user in a supine position, an upper middle chamber configured for supporting a neck of a user in the supine position, a lower middle chamber configured for supporting the neck in the supine position, as well as a top left chamber, a bottom left chamber, a top right chamber and a bottom right chamber configured for supporting a face of the user in a lateral position;

the central chamber, the upper middle chamber and the lower middle chamber are positioned in the middle part of the inflatable pillow, and the central chamber is between the upper middle chamber and the lower middle chamber; and the top left chamber, the bottom left chamber, the top right chamber and the bottom right chamber are positioned at a top left part, a bottom left part, a top right part and a bottom right part of the inflatable pillow respectively.

8. The inflatable pillow of claim 7, wherein a thickness of inflated airbags of the central chamber, the upper middle chamber and the lower middle chamber is smaller than that of inflated airbags of the top left chamber, the bottom left chamber, the top right chamber and the bottom right chamber.

9. A device adapted for inflating and deflating the inflatable pillow of claim 1, comprising an air pump, a plurality of inflating tubes, a micro controller and a communication chip;

wherein the air pump comprises a plurality of inflating holes, each of the inflating holes has a valve, one end of each of the inflating tubes is configured to be connected to one of the inflating holes, and the other end is configured to be connected to one of the airbags of the inflatable pillow; and the micro controller is connected to the valves and configured for controlling the valves to open or close according to instructions from the communication chip.

10. The device of claim 9, wherein the communication chip is a wireless communication chip.

11. The device of claim 10, wherein the wireless communication chip is a Bluetooth chip or a WIFI chip.

12. The device of claim 9, further comprising an external end device, Wherein the external end device communicates with the communication chip.

13. An inflating method implemented through the device of claim 9, comprising:

determining an airbag to be inflated after receiving an inflation start instruction;

determining an inflating hole connected to the airbag to be inflated; and opening a valve of the inflating hole and inflating the airbag to be inflated through the air pump and an inflating tube.

14. The inflating method of claim 13, after inflating the airbag to be inflated through the air pump and the inflating tube, further comprising:

determining an airbag which needs to stop inflation after receiving an inflation stop instruction;

determining an inflating hole connected to the airbag which needs to stop inflation; and closing a valve of the inflating hole connected to the airbag which needs to stop inflation and closing the air pump after determining that no airbag needs to be inflated.

15. The inflating method of claim 13, before receiving the inflation start instruction, further comprising:

generating the inflation start instruction by an external end device after determining that the inflatable pillow needs to be inflated; and transmitting, by the external end device, the inflation start instruction to the communication chip.

16. The inflating method of claim 15, after the external end device transmitting the inflation start instruction to the communication chip, further comprising:

generating the inflation stop instruction by the external end device after determining that inflation to the inflatable pillow needs to be stopped; and transmitting, by the external end device, the inflation stop instruction to the communication chip.

17. A deflating method implemented with the device of claim 9, wherein the method comprises:

determining an airbag to be deflated after receiving a deflation start instruction;

determining an inflating hole connected to the airbag to be deflated; and opening a valve of the inflating hole and deflating the airbag to be deflated through the air pump.

18. The deflating method of claim 17, after deflating the airbags through the air pump, further comprising:

determining the airbag which needs to stop deflation after receiving a deflation stop instruction;

determining the inflating hole connected to the airbag which needs to stop deflation; and closing the valve of the inflating hole and closing the air pump after determining that no airbag needs to be deflated.

19. The deflating method of claim 17, before receiving the deflation start instruction, further comprising:

generating the deflation start instruction by an external end device after determining that a user needs to deflate the inflatable pillow; and transmitting the deflation start instruction to the communication chip by the external end device.

20. The deflating method of claim 17, after the external end device transmitting the deflation start instruction to the communication chip, further comprising:

generating the deflation stop instruction by the external end device after determining that the user needs to stop deflation to the inflatable pillow; and transmitting, by the external end device, the deflation stop instruction to the communication chip.

* * * * *